(No Model.) 2 Sheets—Sheet 1.
B. SMITH.
VELOCIPEDE.
No. 249,207. Patented Nov. 8, 1881.
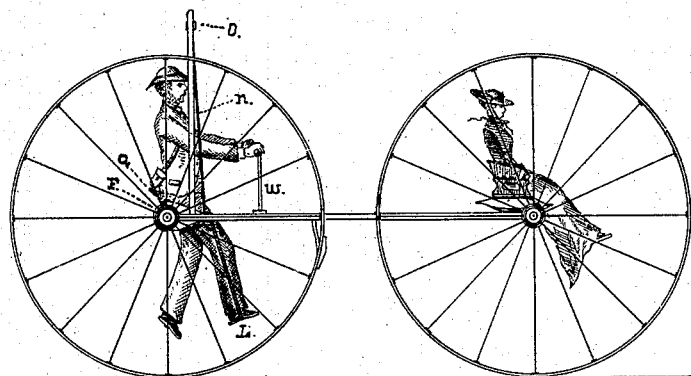
Fig. 1.
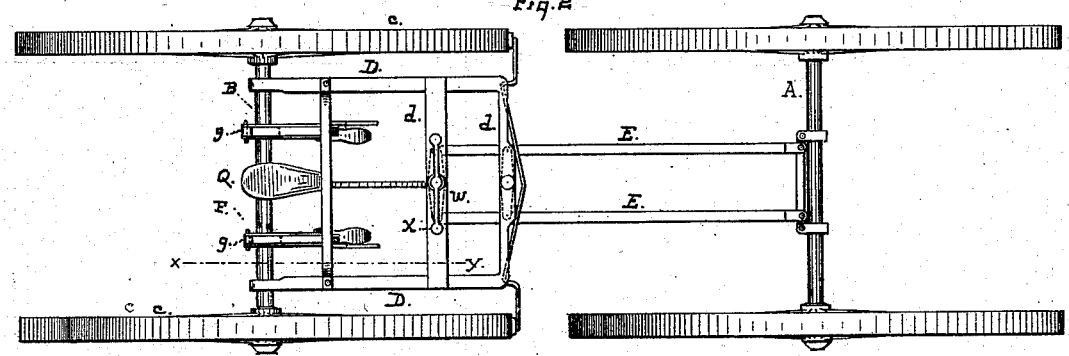
Fig. 2.
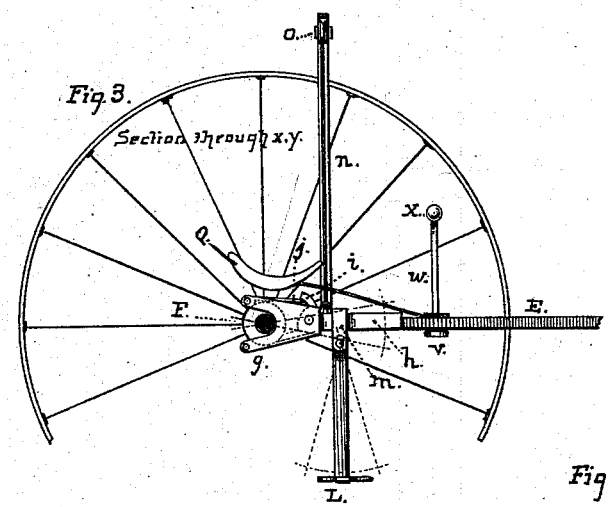
Fig. 3. Section through x.y.
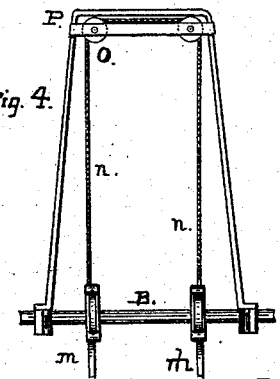
Fig. 4.
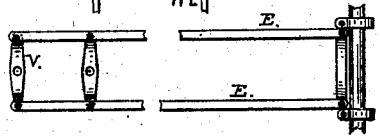
Fig. 5.
Witnesses:
Inventor: Budd Smith
by his Attys. Boone & Boone (No Model.) 2 Sheets—Sheet 2.
B. SMITH.
VELOCIPEDE.
No. 249,207. Patented Nov. 8, 1881.
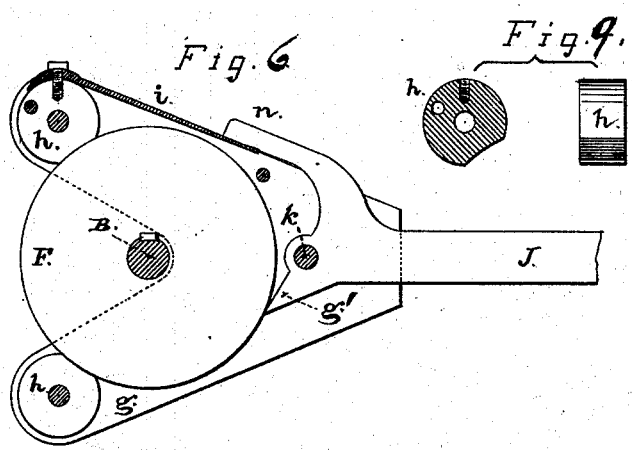
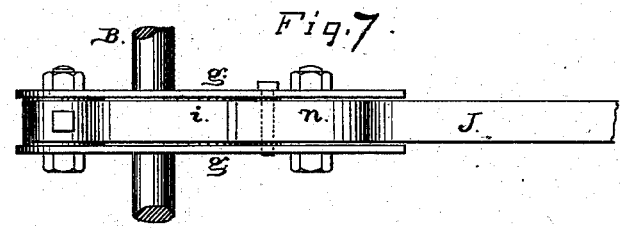
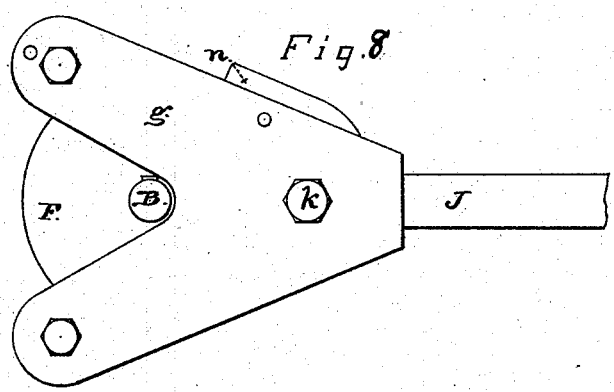
Witnesses:
J. L. Boone
Edw. F. Clark
Inventor:
Budd Smith
By his Attys., Boone & Osborn

UNITED STATES PATENT OFFICE.

BUDD SMITH, OF SAN FRANCISCO, ASSIGNOR TO FRANK P. BACON, OF OAKLAND, AND WALTON G. HUGHES, OF SAN FRANCISCO, CALIFORNIA.

VELOCIPEDE.

SPECIFICATION forming part of Letters Patent No. 249,207, dated November 8, 1881.

Application filed August 3, 1880. (No model.)

*To all whom it may concern:*

Be it known that I, BUDD SMITH, of the city and county of San Francisco, in the State of California, have invented certain new and useful Improvements in Propelling and Steering Three or Four Wheeled Vehicles; and I do hereby declare that the following is a full, clear, and exact description thereof, reference being had to the accompanying drawings.

My invention is applicable to carriages and vehicles having either three or four wheels; and it consists in providing an improved mechanism by means of which the rider, either in a standing position or sitting on a seat or saddle, can, by a walking motion, propel the carriage forward at any desired speed.

It also relates to a novel clutch and operating mechanism which is especially adapted for driving vehicles of this class, but which can also be applied for rotating other shafts, whether stationary or movable, all as hereinafter more fully described.

Referring to the accompanying drawings, Figure 1 is a side elevation of my improvement. Fig. 2 is a plan view. Fig. 3 is an enlarged detail view, being in section on line $x$ $y$, Fig. 2. Figs. 4 and 5 are detail views. Figs. 6, 7, and 8 are views of the clutch, enlarged, respectively, in horizontal section, side elevation, and plan; and Fig. 9 is details of the clutch.

My improved riding-vehicle has either two rear wheels and one front wheel or four wheels, as desired.

A is the forward, and B the rear, axle, the two being connected together by the steering-connections hereinafter described.

The wheels I make as light as possible consistent with the proper amount of strength, and I provide each wheel with a broad tire, C, so that the vehicle will move without jolting or jarring over an uneven surface, such as a cobbled street or a stone pavement, where a narrow tire would slip sidewise off the cobbles or blocks of the pavement and render the machine difficult to steer. A frame, D, has one end secured to the rear axle, while its opposite end is connected with the front axle by means of the parallel steering-rods E E, as shown. The rear axle has two flanges or rims, F F, encircling it at a short distance apart, and they are permanently fixed to the axle, so as to form the gripe wheels or disks of two friction-clutches by which the vehicle is propelled. Each flange or rim is inclosed, or partially inclosed, in a case or frame, $g$, which moves freely around it independent of the axle. The case $g$ is made with two corresponding sides, which are triangular in shape, and the rear side has a V-shaped portion cut out, so that the bottom of the V will straddle the axle, leaving two arms, one of which projects upward above the wheel or disk F, while the other projects below the axle and beyond the face of the wheel or disk. At the extremity of each of these arms I secure a roller, $h$, between the side plates of the case, and to the upper roller I secure a spring-arm, $i$, which extends down between the edges of the side plates to within a short distance of the front extension of the case. I then secure one end of a lever, J, between the side plates at the front extension of the case by means of a bolt, $k$, which passes through the two plates. The rear end of this lever has a pointed arm or prong, $g'$, projecting downward from it under the disk or rim F, and another, $n$, extending upward and passing over the lower end of the spring. A stirrup, L, is suspended from the outer end of each lever J by a hinged hanger, $m$, and the outer end of the lever of one clutch is connected with the outer end of the lever of the other clutch by a rope, N, which passes up over pulleys O O in a frame, P, that extends upward from the frame D, so that when one lever is depressed the other will be raised, the connecting-rope running each way alternately upon the pulleys O as the pressure of the feet is alternately applied to the stirrups.

The operation will then be as follows: When a downward pressure is applied to one lever its lower arm or prong, $g'$, pressing upon the face of the disk F, draws the case or frame forward, so as to press the rollers $h$ against the face of the disk, thus clutching or griping the disk at three points, so as to clamp the frame or case to it. The downward pressure of the lever then turns the disk and axle until the lever of the opposite clutch has griped the other disk in the same way. When the downward pressure is removed from the lever J, the pressure of the lower prong against the face of the disk is released, and the spring-arm $i$ of the upper roller is pressed down by the upper prong, $n$, of the lever J, so as to free the disk and allow it to be rotated freely by the other clutch. This operation is repeated alternately, thus transmitting to the axle a continuous rotary motion.

The rider is supported upon a seat or saddle, Q, directly above the stirrups, in a nearly standing position, his feet resting upon the stirrups, and he operates the clutches alternately by a walking movement, or he can operate the mechanism in a standing position without the seat or saddle. The clutch-levers alternately engage with the rims or pulleys on the axle, as their outer ends are pressed downward by the backward walking movement of the foot of the rider, and releasing them as the foot rises in stepping forward, the rope reeving through the pulleys in each direction alternately as the levers are alternately raised and depressed.

The front ends of the steering-rods E E are pivoted to the front axle at a short distance apart, and the rods extend back parallel with each other, and their rear ends are pivoted to the opposite ends of a cross-bar, V, which is attached to the frame D. The lower end of an upright rod, W, is secured to the middle of the cross-beam V, and this rod extends upward through the frame, and has a cross-bar handle, X, secured to its upper end within easy reach of the rider. The rider grasps the handle X, and by turning it the parallel bars E are moved longitudinally in opposite directions, so as to shift the line of the front axle to the desired position.

In a four-wheeled carriage a seat or body can be placed upon the front part of the vehicle for carrying another person or parcels.

I thus provide a vehicle that is propelled by a walking movement similar to that employed in operating the bicycle. It can be operated with very little exertion, and it enables the rider to carry another person or packages, if he desires.

The clutch herein described can be used for rotating stationary or moving shafts, as desired.

Having thus described my invention, what I claim, and desire to secure by Letters Patent, is—

1. In a three or four wheeled vehicle or carriage, the combination, with the disks or wheels F, fixed upon the rear axle, B, of the friction-levers J, connected to a friction-roll and adapted to bear directly upon said disks or wheels, and with their suspended stirrups L, connected together by the rope N, reeving through the rollers O, whereby the rider is enabled to propel the vehicle by a walking motion, substantially as described.

2. The improved clutch consisting of a flange or disk, F, which is permanently secured to the axle, in combination with the movable frame or case $g$, with its rollers $h$, and the lever J, with its prongs $n$ $g'$, arranged to compress the rollers upon the face of the disk when the outer end of the lever is depressed, substantially as and for the purpose described.

3. The friction-clutch disks F, secured upon the shaft B, inclosed by the movable cases $g$, with friction-rolls bearing upon the disk, and the levers J, bearing directly upon the opposite sides of the disks, and with their outer ends connected together by a rope, N, which passes over pulleys O, substantially as and for the purpose set forth.

4. The combination, with a shaft or axle, B, having the disk F fixed upon it, of a movable forked frame or case inclosing said disk or rim, and the lever adapted to draw the frame forward and bring the disk in contact with the pressing-point of the lever, and one or more fixed points of the inclosing case or frame, substantially as described.

In witness whereof I have hereunto set my hand and seal.

BUDD SMITH. [L. S.]

Attest:
WM. F. CLARK,
W. VOIT.